US005745387A

United States Patent [19]

Corby, Jr. et al.

[11] Patent Number: 5,745,387
[45] Date of Patent: *Apr. 28, 1998

[54] AUGMENTED REALITY MAINTENANCE SYSTEM EMPLOYING MANIPULATOR ARM WITH ARCHIVE AND COMPARISON DEVICE

[75] Inventors: Nelson Raymond Corby, Jr.; Peter Michael Meenan, both of Scotia, N.Y.; Claude Homer Solanas, III, Morgan Hill; David Clark Vickerman, Pleasanton, both of Calif.; Christopher Allen Nafis, Rexford, N.Y.

[73] Assignee: General Electric Company, Schenectady, N.Y.

[*] Notice: The term of this patent shall not extend beyond the expiration date of Pat. No. 5,412,569.

[21] Appl. No.: 536,011

[22] Filed: Sep. 28, 1995

[51] Int. Cl.$^6$ ................................................ G06F 15/50
[52] U.S. Cl. .......................................... 364/578; 348/114
[58] Field of Search ........................ 364/578, 424.01,
364/424.02, 516, 525, 551.01, 559, 570,
571.04; 395/94, 97, 907, 930; 340/853.2,
937, 938, 825.31, 870.07; 434/1, 4, 6, 63,
66; 701/2; 348/114

[56] References Cited

U.S. PATENT DOCUMENTS

| | | | |
|---|---|---|---|
| 4,219,847 | 8/1980 | Pinkney et al. | 358/126 |
| 4,432,931 | 2/1984 | Lockett | 376/248 |
| 4,581,762 | 4/1986 | Lapidus et al. | 382/22 |
| 4,636,137 | 1/1987 | Lemelson | 414/730 |
| 4,706,120 | 11/1987 | Slaughter et al. | 358/103 |
| 4,742,227 | 5/1988 | Takenaka | 250/336.1 |
| 4,818,990 | 4/1989 | Fernandes | 430/870.07 |
| 4,855,822 | 8/1989 | Narendra et al. | 358/103 |
| 4,916,642 | 4/1990 | Kaiser et al. | 364/550 |
| 5,412,569 | 5/1995 | Corby, Jr. et al. | 364/424.01 |

*Primary Examiner*—Kevin J. Teska
*Assistant Examiner*—Matthew Loppnow
*Attorney, Agent, or Firm*—Lawrence P. Zale; Marvin Snyder

[57] ABSTRACT

An enhanced reality maintenance system for operating in a hazardous environment employs an environment modeler which creates a computer model of the environment. An environment renderer creates a plurality of images, each corresponding to a viewing location and orientation, 'viewpoint'. A remotely operated manipulator arm is attached at a fixed end to a stationary structure, has a utility package, such as a video camera, attached to a distal end, and actuators which move the manipulator arm to desired locations within the environment. The position and orientation of the manipulator arm, are determined by a position and attitude (P&A) sensing unit. This information is passed to an manipulator arm renderer which creates an image from a prestored model of the manipulator arm, viewed from several different viewpoints. The may be interactively determined as an offset from the current position and orientation of the utility package. Alternative embodiments include an image archive and comparison unit capable of storing images linked to information of the image acquisition, retrieving stored images and transforming the images to match the image acquisition parameters. Also, another embodiment employs an automated positioner, which desired path information is provided by an operator. The environment, manipulator arm size, shape, and motion constraints, are analyzed to result in a trajectory which most closely fits the provided path information which would not cause a collision with structures in the environment. This trajectory, if acceptable, is then automatically executed by an automated positioner.

5 Claims, 3 Drawing Sheets

1

AUGMENTED REALITY MAINTENANCE SYSTEM EMPLOYING MANIPULATOR ARM WITH ARCHIVE AND COMPARISON DEVICE

CROSS-REFERENCE TO RELATED APPLICATIONS

Related to U.S. patent applications "Augmented Reality Maintenance System" Ser. No. 08/219,565, filed Mar. 29, 1994, and "Augmented Reality Maintenance System With Flight Planner" Ser. No. 08/219,558, filed Mar. 29, 1994, by Nelson R. Corby, Jr., Peter M. Meenan, Claude H. Solanas, David C. Vickerman; all filed with this application and all assigned to the present assignee.

BACKGROUND OF THE INVENTION

1. Field of the Invention

The present invention relates to a manipulator arm and more specifically to computer enhanced environment visualization of a manipulator arm.

2. Description of Related Art

Mechanical arms or robot arms have been used in many areas. They are used to paint car, weld pieces or inspect structures. Typically, one end of a robot arm is fixed to a stationery structure, a fixed end, with the other end being able to move in many dimensions, being the distal end. The arm may have several links connected to joints which move into several dimensions. The end of the last link is the distal end of the mechanical arm. Usually the repair or inspection device is attached to the distal end.

Manipulator arms are also useful for inspection of machines or structures which are in environments which are inaccessible or very hazardous for humans. Several such environments would be inside a nuclear reactor boiler, deep beneath the sea, in a forest fire or in an area contaminated with a poisonous gas. The high temperatures, radiation exposure, high pressure, or toxic effects of these environments are clearly dangerous for humans.

Sensors at the distal end of the manipulator arm may be a testing or imaging device, such as a video camera, underwater TV cameras, ultrasound flaw detection transducers, thermal imagers and point probes such as microphones.

The use of manipulator arms also typically require a method of determining the position and orientation of the distal end of the manipulator arm (and/or its subparts) with respect to the operating environment. This is required to successfully move the manipulator arm through the inspection environment without colliding with structures in the environment.

Manipulator arms can be used to determine physical changes in an environment. One problem arises is that irregularities need to be monitored over a period of time (on the order of years) to determine the rate of deterioration. Presently this is accomplished by moving the manipulator arm to a particular position and videotaping the structure or device which is to be examined. At a later date the manipulator arm is positioned at the same site and current data (such as a video image) is compared to previous data. Since it is very difficult to obtain sensor data with the same parameters, it is difficult to determine differences in the structure over time. This tends to be a hit-or-miss type of adjustment with a very subjective determination being made by the operator.

Another problem which arises in inspecting or examining structures with a manipulator arm is that of planning the actual trajectory of the manipulator arm needed to move it from one site to the next. The environment is complex enough that it is very difficult (and very time consuming) to attempt to move the arm manually. Currently this usually is done by the operator from environment blueprints and knowledge of the manipulator arm size and shape. Realistically, it is very difficult to visualize the complete geometry of the 3D environment and whether a given pathway actually will allow passage of the real manipulator arm. Since control of the manipulator arm is complex and demanding, it becomes a very difficult task for the operator to determine a correct path while manually controlling the position of the manipulator arm.

Currently, there is a need for a system which can provide efficient remote inspection and repair in inaccessible or hazardous environments.

SUMMARY OF THE INVENTION

A remote maintenance system employs an environment modeler for receiving parameters defining structures in a hazardous or inaccessible environment. The environment modeler produces a computer generated model of the environment.

A manipulator arm fixed at one end to a stationary structure of the environment carries a utility package at its distal end (typically for imaging, measuring and repairing structures in the environment). The manipulator arm is capable of moving its distal end to a desired position and orientation within the environment.

A position and attitude sensing (P&A) unit senses the position and orientation each link of the manipulator arm and determines the position and orientation of the distal end of the manipulator arm relative to the environment.

A viewpoint for rendering a computed view of the environment is determined by the operator (either by inputting viewpoint coordinates or by selecting from a pre-established list of viewpoint coordinates) and provided to an environment renderer which generates an image corresponding to the shapes defined by the environment geometry when viewed from the selected viewpoint.

The position and orientation of the distal end of the manipulator arm are provided to the environment renderer along with offsets which define the position and orientation of the utility package. The resultant viewpoint, formed by combining the position and orientation of the distal end of the manipulator arm and the offset displacements of the utility package, will allow the environment renderer to produce images corresponding to views of the environment as "seen" from the viewpoint of the utility package. The imagery produced by the environment renderer will vary in real-time according to the measured position and orientation of the distal end of the manipulator arm varies.

Similarly, position and orientation of the distal end of the manipulator arm is provided to an manipulator arm renderer (along with operator indicated viewpoint). The manipulator arm renderer (making use of the geometry file which defines the shape of the manipulator arm) generates an image of the manipulator arm as seen from the same viewpoint used by the environment renderer.

A video mixer superimposes the image of the manipulator arm on the image of the environment and displays the superimposed images on a monitor, thereby allowing an operator to visualize the position of the manipulator arm relative to its environment.

Several viewpoints and superimposed images may be produced simultaneously to provide multiple views of the manipulator arm in the environment.

In an alternate embodiment, sensory data from the utility package are stored along with auxiliary information such as the spatial location of the sensors and parameters employed in acquiring the sensor data and sensor images. Any of these past images or past sensor data may later be recalled and transformed (if necessary) so as to correspond to the current position and orientation of the manipulator arm and the utility package. Digital signal processing techniques may then be performed to determine the rate of corrosion or rate of crack growth over time, a very important parameter for nuclear reactor maintenance. In addition, a signal processing and visualization unit allows current or past signals from other modalities, such as ultrasound scans, to be merged with past archived signals. Pertinent data such as past inspection results and operator observations may also extracted from an inspection database automatically and displayed for operator consideration.

In another alternate embodiment, means are provided for the operator to select a trajectory, being a time-ordered sequence of locations to be visited by the distal end of the manipulator arm. Environment geometry, manipulator arm geometry and the selected trajectory, are provided to an automated positioner which causes the manipulator arm to move according to the trajectory.

OBJECTS OF THE INVENTION

It is an object of the present invention to provide a system for visualizing the position and orientation of a manipulator arm and utility package within a known environment.

It is another object of the present invention to provide a manipulator arm which efficiently navigates through a hazardous environment crowded with objects.

It is another object of the present invention to provide a maintenance system which has the ability to sense physical characteristics of a structure or device, archive a spatial representation of physical characteristics and retrieve these spatial representation at a later date to be compared against other spatial representations in order to determine deterioration or changes in a structure or device.

BRIEF DESCRIPTION OF THE DRAWING

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

Figure 1:
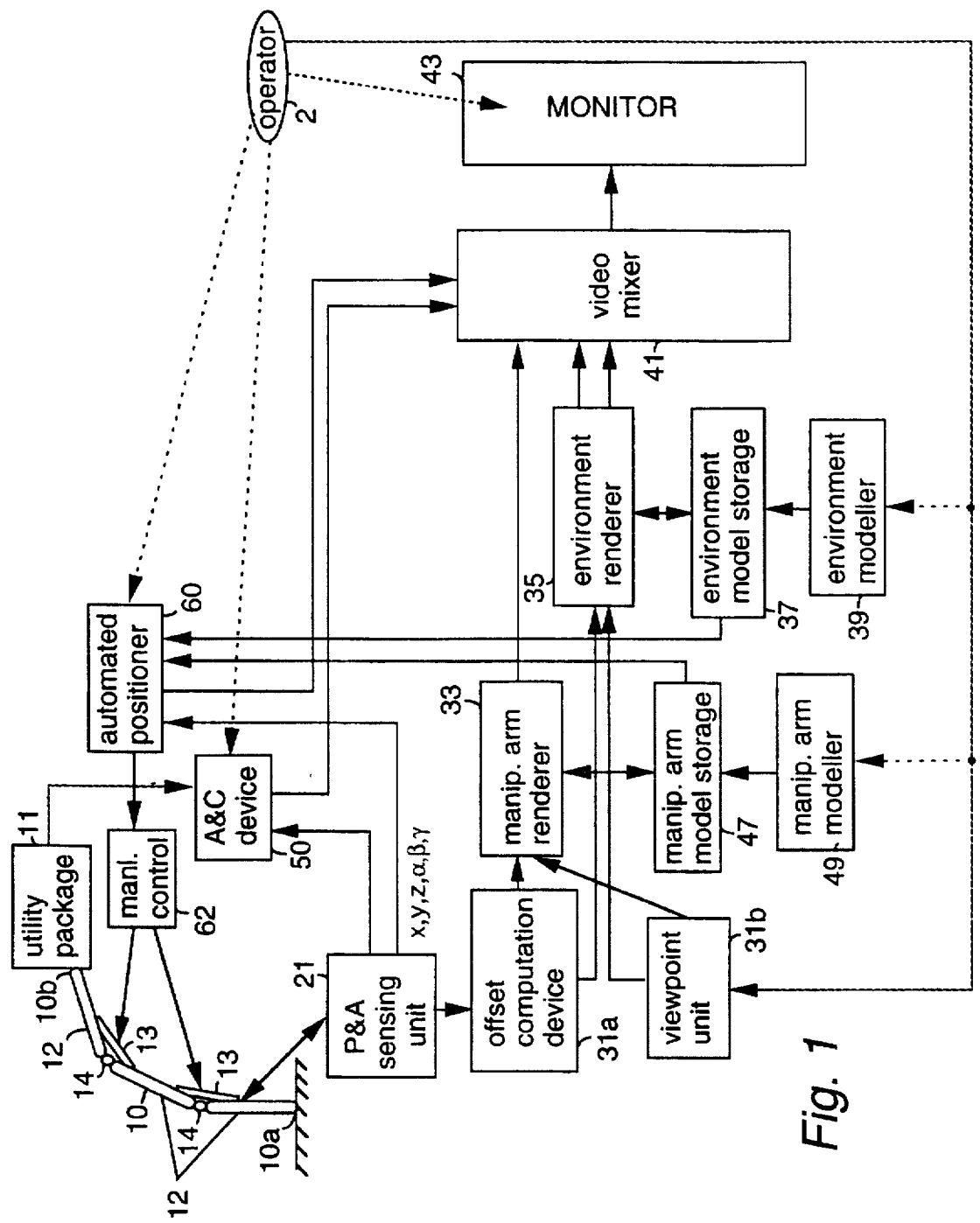
FIG. 1 is a simplified block diagram of an augmented reality maintenance system according to the present invention.

FIG. 1 is a simplified block diagram of the major components of an augmented reality maintenance system according to the present invention.

In FIG. 1, parameters defining an environment, such as blueprint measurements, position and shape measurements, and material types may be manually provided to an environment modeler 39. These parameters may also be automatically provided by automated spatial measurement from ultrasound or laser distance measurement devices. Environment modeler 39 constructs a computer model from the parameters it receives which may be rapidly manipulated in near-real-time. The model is stored in environment model storage device 37.

Parameters defining the geometry of a manipulator arm 10 and its motion constraints are provided to a manipulator arm modeler 49. Manipulator arm modeler 33 constructs a computer model from the parameters it receives. The model of the manipulator arm is stored in manipulator arm model storage device 47.

An environment renderer 35 has the capability of accessing the model in environment model storage device 37, and displaying it as viewed from any location and orientation, known as a 'viewpoint'. It also has the capability of creating several displays of the model viewed from several different viewpoints simultaneously.

Manipulator arm 10 has a series of arm links 12 connected at joints 14 which are moved by a plurality of actuators 13. A fixed end 10a of manipulator arm 10 is connected to a stationary structure at a known point. A distal end 10b is attached to a utility package 11.

Utility package 11 may be a spatial imaging device, such as a video camera which acquires information such crack and corrosion in a wall of a nuclear reactor boiler, for example. Utility package 11 may also be an ultrasound device capable of detecting irregularities in a structure or device, or any such modality used in structure examination. Utility package 11 could also be a point measurement probe such as a microphone or accelerometer to measure vibrations. Also, more that one sensor could be operating at any time. Utility package 11 may also employ a welding drill or other repair device.

Joints 14 interact with a position and attitude sensing (P&A) unit 21 which determine a position (x,y,z) and orientation ($\alpha,\beta,\gamma$) of each of the links 12 of manipulator arms 10, and may thereby determines the ultimate position and orientation of distal end 10b by combining the positions and orientations of the individual links. P&A unit 21 may also determine the position and orientation of distal end 10b by directly tracking distal end with radiofrequency signals or other conventional tracking means.

The position (x,y,z) and orientation ($\alpha,\beta,\gamma$) determined by P&A sensing unit 21 is provided to an manipulator arm renderer 33. Manipulator arm renderer 33 creates an image of a prestored model of the manipulator arm 10 from model storage 47 at location (x,y,z) and orientation ($\alpha,\beta,\gamma$) as viewed from an viewpoint provided to it. Manipulator arm renderer 33 has the capability of creating several images of the manipulator arm model viewed from several different viewpoints simultaneously. The position and orientation of the manipulator arm 10, produced by P&A sensing unit 21, are supplied to offset computation device 31a. This device calculates another viewpoint corresponding to the current position of utility package 11.

The environment renderer 35 produces a number of images of the environment corresponding to viewpoints supplied to it. In FIG. 1, two viewpoints are supplied—one from the viewpoint unit 31b and another from the offset computation device 31a. The environment renderer 35 produces two image signals, one showing the environment viewed from the same viewpoint supplied to the manipulator arm renderer 33, and a second showing the environment as seen from the viewpoint of the utility package 11 at distal end 10b of manipulator arm 10.

The viewpoint provided to renderer 33 and environment renderer 35 may be predetermined values which have been typed into, or previously stored in, viewpoint unit 31b, or operator-supplied input.

The images pertaining to the same viewpoint are provided to a video mixer 41. In the embodiment shown in FIG. 1, two viewpoints are employed, with two images produced by environment renderer 35 and one by the manipulator arm renderer 33. The manipulator arm image and the environment image for the same viewpoint are provided to video mixer 41, to superimpose the manipulator arm image on the environment image resulting in a superimposed image showing the relative position of the arm or in the simulated environment, which corresponds to the actual position of the manipulator arm relative to the actual environment.

The image produced on monitor 43 may consist of a number of sub-images comprising the main image. One such sub-image is the result of merging the image of the environment produced by the environment renderer 35 with the image of the manipulator arm produced by the manipulator arm renderer 33. The viewpoint for both renderers is the same and is supplied by viewpoint unit 31b. The second sub-image may be a view of the environment as seen from the point of view of the utility package 11 on distal end 10b of manipulator arm 10. The third sub-image appearing on monitor 43 is image produced by the utility package 11.

In alternative embodiments, more or fewer viewpoints, images may be used to create more or fewer superimposed images. Also, in another alternative embodiment, an operator may select or change any of the viewpoints and the offsets during operation.

Figure 2:
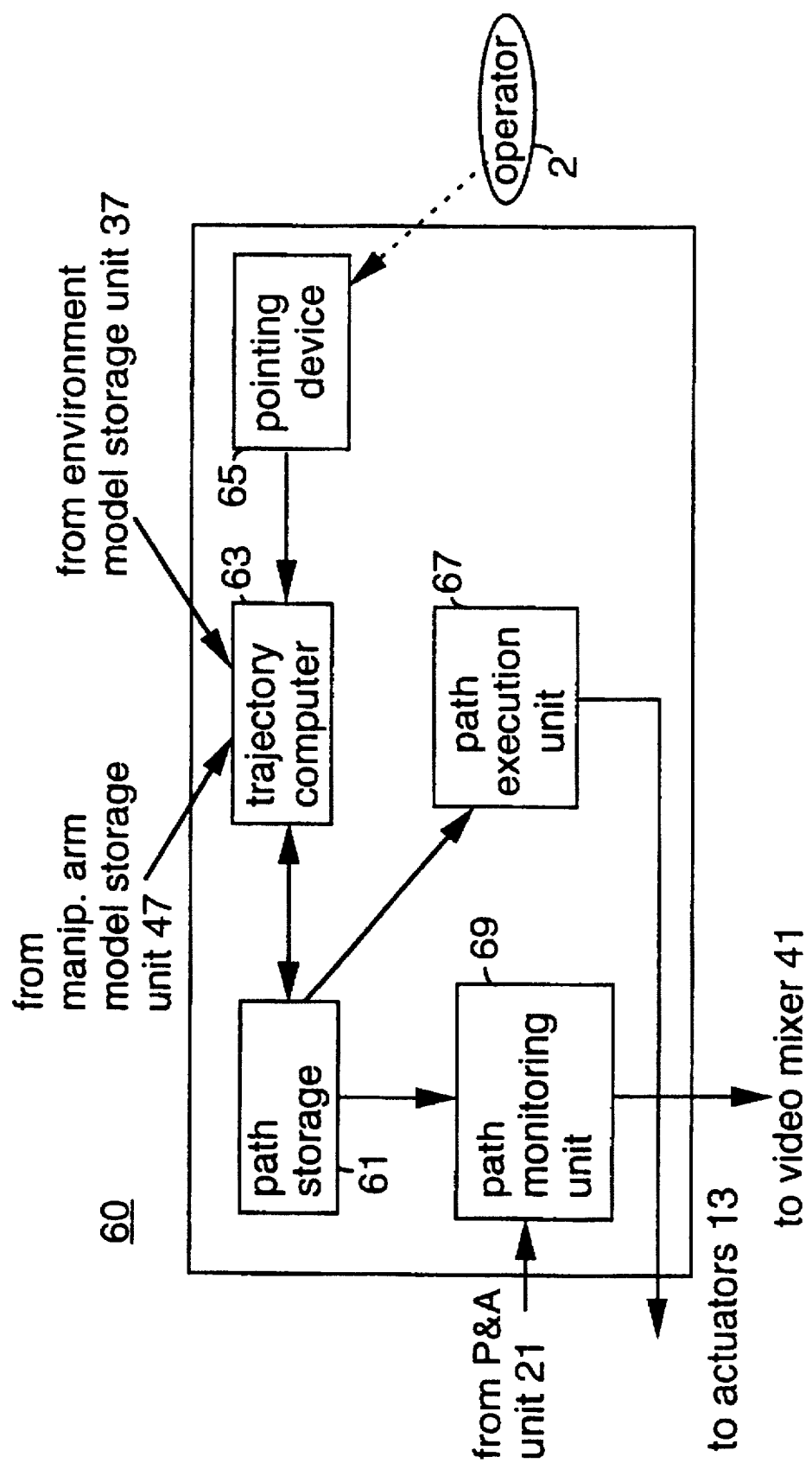
FIG. 2 is a more detailed block diagram of automated positioner of FIG. 1.

In another embodiment, the present invention further employs an automated positioner 60 which is coupled to environment model storage device 37, manipulator arm model storage device 47 and actuators 13. FIG. 2 is a more detailed block diagram of automated positioner 60 of FIG. 1. In FIG. 2, automated positioner 60 is composed of an pointing device 65, a path storage device 61 for storing intended paths, or trajectories of distal end 10b of manipulator arm 10, an automated positioner 67 and a trajectory computer 63. Pointing device 65 is used by operator 2 to chose destination locations in the environment which the distal end 10b of manipulator arm 10 is to visit, which are provided to trajectory computer 63. Trajectory computer determines a trajectory which fits the motion constraints of the arm, is within the reach of manipulator arm 10, and one in which links 12 do not collide with objects in the environment, that most closely fits the path defined by operator 2. The computed trajectory may then be displayed to the operator on monitor 43 via video mixer 41 of FIG. 1.

If the computed trajectory is acceptable, automated positioner 67 drives actuator 13 to move manipulator arm 10 according to the trajectory calculated by trajectory computer 63. The current calculated trajectory is then executed by manipulator arm 10 within the actual environment upon command by operator 2.

In the embodiment which does not include automated positioner 60, a manual control device 62 interacts with the operator to allow operator 2 to manually position manipulator arm 10, and control settings of utility package 11.

In the embodiment which includes automated positioner 60, the automated positioner may be set to a 'type-through', manual override mode in which commands sent to it are passed directly to and from manual control device 62 which interacts with the operator to allow operator 2 to manually position manipulator arm 10, and control settings of utility package 11.

Operator 2 may also define destination points by typing symbolic names, or numerical locations into pointing device 65.

Optionally, a path monitoring unit 69 reads the selected trajectory from path storage device 61, and receives the current position and orientation of the distal end 10b of manipulator arm 10, and indicates on monitor 43, via video mixer 41, the selected trajectory and the current path followed by manipulator arm 10.

Since rapid, accurate determination of irregularities is very important in many cases, such as off-line maintenance of a nuclear power plant, and costs are related to the length of time the plant is off-line, it is important to collect, retrieve and compare image data rapidly. In conventional systems, video image are acquired of suspect sites of a structure. At a later date, manipulator arm 10 is directed manually to one of the suspect sites. A current video image is acquired, and the images are viewed side-by-side, usually in real-time, to determine the degree of deterioration. The comparisons are only valid when the archived image and the current image have the similar imaging parameters. Imaging parameters vary from one modality to another. For example, video cameras imaging parameters include the viewpoint, field-of-view, iris opening, zoom setting etc. By varying these parameters, the image becomes different.

The information from past inspections at a given site may take many forms such as photographs, video frames, video sequences on videotape, computer generated images which visualize data such as 2D ultrasonic inspection data, thermal imagery as well as inspectors reports and notes and non-image data e.g. audiotapes.

Figure 3:
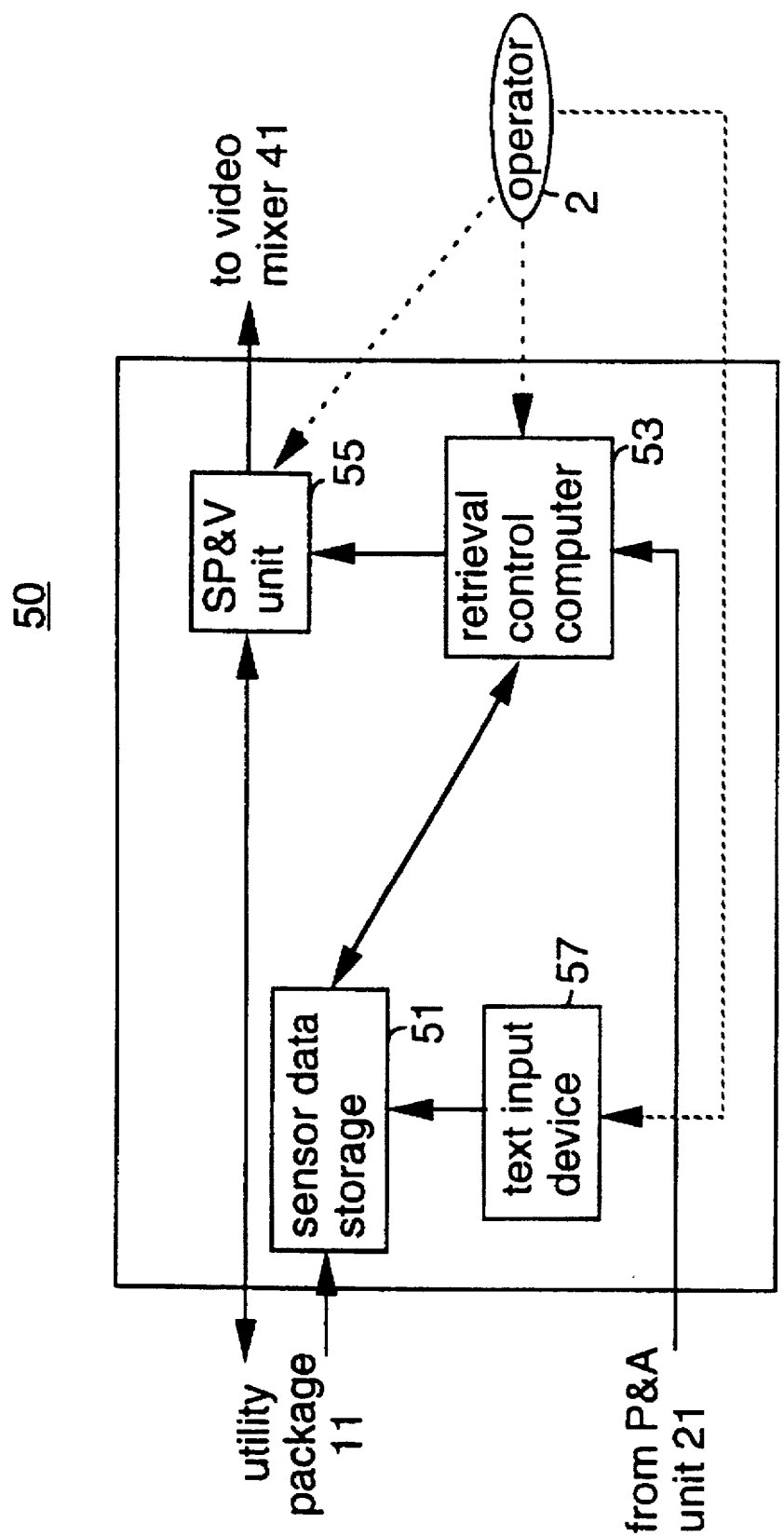
FIG. 3 is a more detailed block diagram of the archive and comparison (A&C) device of FIG. 1.

In another embodiment of the present invention, the invention comprising all of the previously described elements of FIG. 1, with automated positioner 60 being optional, further comprises an archive and comparison (A&C) device 50. FIG. 3 is a more detailed block diagram of the A&C device of FIG. 1. In FIG. 3, A&C device 50 utilizes a sensor data storage device 51, capable of storing spatial imagery with location, orientation and acquisition parameters linked to each image. These parameters define the identity of the site imaged, when it was imaged, the viewpoint, the modality of the imager (visual, thermal, ultrasonic etc.) and description of values relating to the image (crack length, corrosion area etc.). In addition, storage device 51 provides storage for textual information such as inspectors reports and storage of non-image signal data such as recordings of microphones or accelerometers carried by manipulator arm 10. The textual data, and non-image signal data, also are linked to specific inspection sites and time stamped for identification at a later retrieval time. Much of the information provided to storage device 51 originates in utility package 11 carried by the manipulator arm 10. Textual information may be provided by a text input device 57.

A&C device 50 also includes a retrieval control computer 53, coupled to the data storage device 51, the P&A unit 21, the signal processing unit and visualization (SP&V) unit 55. Retrieval control computer 53, upon command by operator 2, retrieves all past data from storage device 51 which is pertinent to the site currently being examined and visited by the utility package at distal end 10b of manipulator arm 10. SP&V unit 55 receives sensor data from utility package 11 and past inspection data from storage device 51 under control of the retrieval control computer 53. SP&V unit 55 transforms images archived in sensor data storage device 51, according to the position, orientation and imaging parameters, to match those of images currently being acquired by utility package 11. Operator 2 may also provide commands to SP&V unit 55 causing SP&V unit 55 to adjust the settings of utility package 11, or to otherwise control utility package 11. The signals to be compared may then be place on the same basis. SP&V unit 55 may either display the two images to operator 2 via video mixer 41 on monitor 43 in a side-by-side format, superimpose them, display image differences or employ any appropriate image processing methods thus highlighting regions for special attention by operator 2. The differences may be highlighted by color coding, graphical display etc. SP&V unit 55 may also display its results of comparisons and image processing in any appropriate form for consideration by operator 2.

SP&V unit 55 may also operate on non-image signals, such as sound data, to cause two signals to have the same acquisition parameters, and perform comparisons and signal processing on the transformed signals.

Retrieval control computer 53 may select two archived images to compare against each other instead of one archived and one current image. SP&V unit 55 will transform, one image, the other image, or both, to have the same viewpoint and imaging parameters allowing them to be directly compared. A number of archived images for the same site acquired at different times, may be transformed by the SP&V unit 55, to compose a 'time-lapse' movie when they are played back a time-ordered sequence.

While several presently preferred embodiments of the present novel invention have been described in detail herein, many modifications and variations will now become apparent to those skilled in the art. It is our intent therefore, to be limited only by the scope of the appending claims and not be the specific details and instrumentalities presented by way of explanation herein.

What we claim is:

1. A remote maintenance system for inspection and identifying differences in structures in a predetermined region over time comprising:
   a) a manipulator arm having
      1. a utility package, for inspecting said structures according to selected acquisition settings, and for creating a present multi-dimensional sensor signal indicating physical properties of said structures, and
      2. actuators capable of maneuvering the manipulator arm responsive to user-selected input;
   b) environmental model storage device capable of retaining computer graphic information regarding said structures;
   c) a position and attitude (P&A) sensing unit for measuring a position and orientation of the manipulator arm;
   d) environment modeler for receiving the computer graphic information defining said structures and producing a conventional computer generated model of said structures and storing the model in the environment model storage device;
   e) environment renderer coupled to the environment model storage device for generating an image of said structures from the environment model as viewed from a user-selected viewpoint;
   f) manipulator arm renderer coupled to the P&A sensing unit for generating a conventional computer generated image of the manipulator arm at a position and orientation corresponding to that of the manipulator arm, generated from a prestored model of the manipulator arm as viewed from a user-selected viewpoint;
   g) monitor for displaying images provided to it;
   h) video mixer coupled to the environment renderer and the manipulator arm renderer for displaying the images on the monitor, thereby allowing an operator to visualize the position of the manipulator arm relative to its environment; and
   i) an archive and comparison (A&C) device coupled to the video mixer and the P&A sensing unit and utility package, operating to:
      i. archive the present multi-dimensional sensor signal from the utility package along with its acquisition settings,
      ii. retrieve a previously archived multi-dimensional sensor signal measuring the same structure and its physical properties, and its associated acquisition settings,
      iii. rectify the present and archived multi-dimensional sensor signals to have the same acquisition settings,
      iv. compare the rectified signals to identify and characterize differences, and
      v. display differences and archived signals on the monitor.

2. The remote maintenance system of claim 1 further comprising offset computation device coupled to the P&A sensing unit which provides the viewpoint, being a predetermined offset from a user-selected location and orientation of the manipulator arm, as measured by the P&A sensing unit, the viewpoint being employed by the environment renderer and the manipulator arm renderer in image rendering.

3. A remote maintenance system for inspection and repair of structures in a predetermined region comprising:
   a) a manipulator arm having
      1. a utility package, for inspecting said structures according to selected acquisition settings, and for creating a present multi-dimensional sensor signal indicating physical properties of said structures;
      2. actuators capable of maneuvering the manipulator arm responsive to user-selected input;
   b) environmental model storage device capable of retaining computer graphic information regarding said structures;
   c) a position and attitude (P&A) sensing unit for measuring a position and orientation of the manipulator arm;
   d) environment modeler for receiving the computer graphic information defining said structures and producing a 3D computer model of said structures and storing the model in the environment model storage device;
   e) environment renderer coupled to the environment model storage device for generating an image of said structures from the environment model as viewed from a user-selected viewpoint;
   f) manipulator arm renderer coupled to the P&A sensing unit for generating a computer generated image of the manipulator arm at a position and orientation corresponding to that of the manipulator arm, generated from a prestored 3D model of the manipulator arm as viewed from a user-selected viewpoint;
   g) monitor for displaying images provided to it;
   h) video mixer coupled to the environment renderer and the manipulator aim renderer for displaying the images on the monitor, thereby allowing an operator to visualize the position of the manipulator arm relative to its environment;
   i) sensor data storage unit for archiving a plurality of utility package signals and corresponding acquisition settings;
   j) retrieval computer coupled to the sensor data storage unit operating to:

i. receive user-defined criteria indicating archived multi-dimensional sensor signals to be selected, ii. select an archived multi-dimensional sensor signal and its acquisition settings from the sensor data storage unit which fit criteria set by the operator, iii. receive the present multi-dimensional sensor signal and acquisition settings from the manipulator arm utility package, and 4. recitify the archived multi-dimensional sensor signal according to the present multi-dimensional sensor signal acquisition settings to result in a rectified signal; and k) signal processing and visualization (SP&V) unit coupled to the retrieval computer operating to:

i. compare the rectified signal to the present multi-dimensional sensor signal to identify and characterize differences, and ii. producing a visual image of the differences to a user for analysis.

4. A remote maintenance system for inspection and repair of structures in a predetermined region comprising:

a) a manipulator arm having 1. a utility package, for inspecting said structures according to selected acquisition settings, and for creating a present multi-dimensional sensor signal indicating physical properties of said structures;

2. actuators capable of maneuvering the manipulator arm responsive to user-selected input;

b) environmental model storage device capable of retaining computer graphic information regarding said structures;

c) a position and attitude (P&A) sensing unit for measuring a position and orientation of the manipulator arm;

d) environment modeler for receiving the computer graphic information defining said structures and producing a 3D computer model of said structures and storing the model in the environment model storage device;

e) environment renderer coupled to the environment model storage device for generating an image of said structures from the environment model as viewed from a user-selected viewpoint;

f) manipulator arm renderer coupled to the P&A sensing unit for generating a conventional computer generated image of the manipulator arm at a position and orientation corresponding to that of the manipulator arm, generated from a prestored 3D computer model of the manipulator arm as viewed from a user-selected viewpoint;

g) monitor for displaying images provided to it;

h) video mixer coupled to the environment renderer and the manipulator arm renderer for displaying the images on the monitor, thereby allowing an operator to visualize the position of the manipulator arm relative to its environment;

i) sensor data storage unit for archiving a plurality of multi-dimensional sensor signals and corresponding acquisition settings;

j) retrieval computer coupled to the sensor data storage unit operating to:

i. receive user-selected criteria defining archived utility package signals to be selected, ii. select an archived multi-dimensional sensor signal and its acquisition settings from the sensor data storage unit which fit criteria set by the operator, iii. select a first and second archived multi-dimensional sensor signal and corresponding acquisition settings, and iv. rectify the first archived multi-dimensional sensor signal according to the second archived multi-dimensional sensor signal acquisition settings to result in a rectified signal; and k) signal processing and visualization (SP&V) unit coupled to the retrieval computer operating to:

i. compare the rectified signal to the second archived multi-dimensional sensor signal to identify and characterize differences, and ii. produce a visual image of the differences to the operator for analysis.

5. The remote maintenance system of claim 4 wherein the utility package further comprises a repair device connected to the manipulator arm for effecting repair of a selected structure.

* * * * *